United States Patent
Voß et al.

(10) Patent No.: US 11,898,649 B2
(45) Date of Patent: Feb. 13, 2024

(54) BYPASS VALVE AND PIG HAVING A BYPASS VALVE

(71) Applicant: ROSEN Swiss AG, Stans (CH)

(72) Inventors: Wilhelm Voß, Lingen (DE); Heiner Krallmann, Twist (DE); Nico Heile, Kettenkamp (DE); Rene Bremke, Alfhausen (DE); Daniel Schneke, Lingen (DE)

(73) Assignee: ROSEN Swiss AG, Stans (CH)

(*) Notice: Subject to any disclaimer, the term of this patent is extended or adjusted under 35 U.S.C. 154(b) by 1283 days.

(21) Appl. No.: 16/462,592

(22) PCT Filed: Dec. 5, 2017

(86) PCT No.: PCT/EP2017/081565
§ 371 (c)(1),
(2) Date: May 21, 2019

(87) PCT Pub. No.: WO2018/104327
PCT Pub. Date: Jun. 14, 2018

(65) Prior Publication Data
US 2020/0063879 A1 Feb. 27, 2020

(30) Foreign Application Priority Data
Dec. 8, 2016 (DE) .......................... 202016106843.6

(51) Int. Cl.
*F16L 55/38* (2006.01)
*F16K 17/30* (2006.01)
(Continued)

(52) U.S. Cl.
CPC ............ *F16K 17/30* (2013.01); *B08B 9/0551* (2013.01); *B08B 9/0557* (2013.01);
(Continued)

(58) Field of Classification Search
CPC .............. F16L 55/38; F16L 55/24; B08B 9/08
See application file for complete search history.

(56) References Cited

U.S. PATENT DOCUMENTS

| 2,860,356 | A | * | 11/1958 | Matheny | ................. | F28G 1/166 |
| | | | | | | 15/104.061 |
| 2010/0170535 | A1 | * | 7/2010 | Freeman | ................. | F16L 55/38 |
| | | | | | | 15/104.062 |

(Continued)

OTHER PUBLICATIONS

International Search Report dated Feb. 27, 2018.

*Primary Examiner* — Michael D Jennings
(74) *Attorney, Agent, or Firm* — Husch Blackwell LLP

(57) ABSTRACT

A bypass valve for an inspection and/or cleaning pig which is intended to move through a pipeline through which medium flows. The bypass valve comprises an inner space which is provided with a flow profile and in which there is arranged a piston which can be moved in the longitudinal direction of the bypass valve by means of a force storage medium in a pressure-dependent manner. The piston can also be moved between a first open position of the bypass valve which enables a bypass for the medium and a second position which at least substantially closes the bypass. The piston can be further moved from the first position via the second position in the same direction into a maximum position which opens the bypass again and pig for inspection and/or cleaning of pipelines.

11 Claims, 7 Drawing Sheets

(51) Int. Cl.
    *B08B 9/055* (2006.01)
    *F16K 17/04* (2006.01)
    *G01M 3/00* (2006.01)
    *F16L 101/12* (2006.01)
    *F16L 101/30* (2006.01)

(52) U.S. Cl.
    CPC .......... *F16K 17/044* (2013.01); *F16K 17/048* (2013.01); *F16L 55/38* (2013.01); *G01M 3/005* (2013.01); *B08B 2209/055* (2013.01); *F16L 2101/12* (2013.01); *F16L 2101/30* (2013.01)

(56) References Cited

U.S. PATENT DOCUMENTS

2014/0290604 A1* 10/2014 Howell ................... F16K 17/10
                                                      251/12
2015/0240985 A1* 8/2015 Soliman ................. F16L 55/38
                                                      134/8

* cited by examiner

BYPASS VALVE AND PIG HAVING A BYPASS VALVE

CROSS REFERENCE

This application claims priority to PCT Application No. PCT/EP2017/081565, filed Dec. 5, 2017, which itself claims priority to German Patent Application 20 2016 106843.6, filed Dec. 8, 2016, the entirety of both of which are hereby incorporated by reference.

FIELD OF THE INVENTION

The present invention relates to a bypass valve for an inspection and/or cleaning pig which is intended to move through a pipeline through which medium flows, wherein the bypass valve comprises an inner space which is provided with a flow profile and in which there is arranged a piston which can be moved in the longitudinal direction of the valve by means of a force storage medium in a pressure-dependent manner and which can be moved between a first open position of the valve which enables a bypass for the medium and a second position which at least substantially closes the bypass.

BACKGROUND

For the cleaning and inspection of pipelines, pigs which are constructed as steel members with polyurethane discs or polyurethane sleeves of different hardnesses have been found to be the most effective and flexible. For cleaning or inspection, the pig is driven with the medium which is intended to be transported through the line. In this instance, the cleaning pig pushes out, for example, deposited material which originates with the gas from the bore hole and which is deposited in the line. As the speed of the pig increases, the cleaning effect or the quality of the data recorded during an inspection of the pipeline decreases rapidly, which can lead to problems in particular in gas lines in which gas is driven at high speed through the pipeline.

In order to nonetheless achieve an effective cleaning or measurement, there is known from US 2010/0170535 A1 a piston, on the one hand, while the pig is being inserted into the pipeline and, on the other hand, also while travelling through the pipeline can virtually instantaneously change between an open position and a closed position which substantially closes the bypass. Before the operation, by adjusting a force storage medium the force which is applied thereby to the piston can be changed. The pig can consequently be adapted to a small degree to the pipeline conditions.

So that the pig does not remain stuck on relatively small obstacles, such as, for example, variations in wall thickness, weld seam passages or relatively small bumps, as a result of the slowing of the thrust brought about by increased friction, there is built up a pressure difference which, at a specific value, presses the piston in the narrowest position of the valve. The valve closes, wherein where applicable a leakage flow which prevents jamming of the valve remains until the pressure increase which is produced leads to the obstacle being overcome and a sometimes very high acceleration of the pig. The piston is moved into the open position again when the pressure difference between locations in front of and behind the pig has decreased again to a sufficient degree.

The speeds which change rapidly, in particular with a significant acceleration after becoming stuck, result in impairments of the cleaning or data recording which in an extreme case can lead to a repeated cleaning or inspection operation.

SUMMARY OF THE INVENTION

An object of the present invention is to be able to better regulate the speed of a pig which moves through the line.

According to the invention, the piston can be further moved from the first position via the second position in the same direction into a maximum position which opens the bypass again. Of course, the flow cross-section which is released in the maximum position is significantly smaller than the free flow cross-section which is available in the first position and is further significantly larger than the cross-section which is available in the closed position or second position of the piston. Any free cross-section for a leakage flow is only there to prevent the piston from becoming jammed.

As a result of the possibility of moving the bypass valve or the piston thereof into a maximum position, in particular in the case of extreme obstacles which often cannot be foreseen, such as, for example, very large bumps on which the pig becomes completely jammed, destruction of the pig or even the pipeline can be prevented. In such an extreme case, the differential pressure between the pipeline regions in front of and behind the pig or the corresponding bypass valve increases in an extreme manner and the piston, with a preferably adjustable opening pressure of at least 5, preferably at least 7 or 8 bar and up to 14 bar being applied, moves into the maximum position so that the bypass is opened again and the maximum pressure is reduced. This ensures the integrity of the installation and prevents the total shutdown of the pipeline in the event of the pig becoming jammed.

The advantages described according to the invention are afforded consequently for a bypass valve in particular when it is part of an inspection or cleaning pig.

Furthermore, the piston is constructed in a region of the inner space preferably to assume in a pressure-dependent manner intermediate positions between the first and the second position, in particular in a drive pressure range between 0.01 and 0.5, in particular between 0.02 and 0.4 bar, in order to enable a pressure-regulated volume flow through the bypass valve. When viewed in the longitudinal and throughflow direction of the bypass valve, the piston is consequently preferably located first in an open position, further upstream with a larger differential pressure than in a central position in an at least substantially closed position, and then even further upstream from a critical opening pressure in a maximum position which permits a flow which is necessary under extreme conditions through the bypass valve.

In particular, the piston is located with the maximum cross-sectional surface-area thereof in the maximum position in a widened region of the inner space of the bypass valve, which region is upstream or displaced forwards with respect to a throughflow direction.

For a volume flow through the bypass valve which is not only substantially binary (open/closed) but in particular pressure-regulated in accordance with the applied pressure, the flow profile of the inner space and/or the profile of the piston is/are constructed so as to be optimised in terms of flow in such a manner that in at least 50% of the drive pressure region the volume flow directed through the bypass valve does not change by more than 60%. The shape required for this may, for example, be able to be found for each bypass valve using calculation methods based on empirical observations and consequently be able to be defined for the bypass valve used in each case in accordance with the respective pipeline conditions and media used. With such a pressure-regulated actuation of the bypass valve, the pig remains longer in the desired speed range.

Starting from an inlet opening, the profile of the inner space or the inner space of the valve initially tapers uniformly in order to then narrow significantly more powerfully in the transition region to a central valve region. Subsequently, an inner space region with a consistent inner diameter is present, wherein subsequently the inner space expands again with an in particular more significant absolute inclination than in the tapering region. This higher degree of expansion is particularly advantageous for the sudden application of an opening pressure in order to prevent the risk which arises in particular with almost incompressible media of damage to the pig/bypass valve or the pipeline.

Furthermore, the tapering and expanding regions are constructed to be optimised in terms of flow in such a manner that a flow which is as laminar as possible is produced. Consequently, the piston profile is also adapted to the tapering region in such a manner that as the path increases in the longitudinal direction the free cross-section available for a throughflow changes to an extent which enables a volume flow which is as consistent as possible in accordance with the pressure present.

The bypass is in particular large enough and takes up to 25% of the line cross-section up in order to achieve a significant speed reduction. The passage space in the valve was consequently adapted in such a manner that as a result of the bypass the volume flow can be kept constant in a large range. With changes of the operating pressure, the medium or the desired operating speed, the operating region of the bypass valve can be adapted by changing the force storage medium or media.

The construction is constructed to be comparatively mechanically simple and secure when the piston has a hollow rod region in which the force storage medium is at least partially arranged and is guided by a central pin.

Advantageously, the maximum position is assumed counter to the change, in particular the compression, of a second force storage medium and/or after the pressure-dependent release of an additional piston operating path. Precisely by using two force storage media which are configured with different operating ranges, a practical excess pressure switching of the bypass valve can be achieved, wherein by using, for example, springs or gas pressure cylinders as force storage media, these can be configured in accordance with the desired or present conditions and peripheral line conditions.

Preferably, the two force storage media are configured in such a manner that, from the closed position, the second force storage medium in the maximum position is compressed to a greater extent in the longitudinal direction than the first force storage medium. In particular, the first force storage medium may be a spring which is then compressed and which cannot be compressed further or only to a minimal extent, whilst the additional second force storage medium can only be compressed significantly in the longitudinal direction when the desired opening pressure is applied. For example, the second force storage medium may be a plurality of plate springs which are arranged one behind the other in a longitudinal direction and whose spring constants are significantly greater than those of a helical spring which was previously used for the normal operation of the bypass valve.

It is thereby further possible for the bypass valve to be constructed to be shorter in the central region and the configuration of the bypass valve to be able to be better adapted to the respective peripheral conditions.

Advantageously, the two force storage media when viewed in the longitudinal direction are arranged one behind the other and in abutment with each other, wherein the mutual abutment can also be carried out by means of intermediate inserts which are guided by means of preferably a central pin.

The effects which are produced by the construction of the bypass valve are in particular present when the bypass valve is used in a pig for inspection and/or cleaning of pipelines. Accordingly, the object set out in the instruction is achieved both by a pig in which the bypass valve described above and below is arranged in a central member of the pig and by a pig for inspection and/or cleaning of pipelines in which the central member is at least also formed by the externally preferably hollow-cylindrical bypass-valve.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
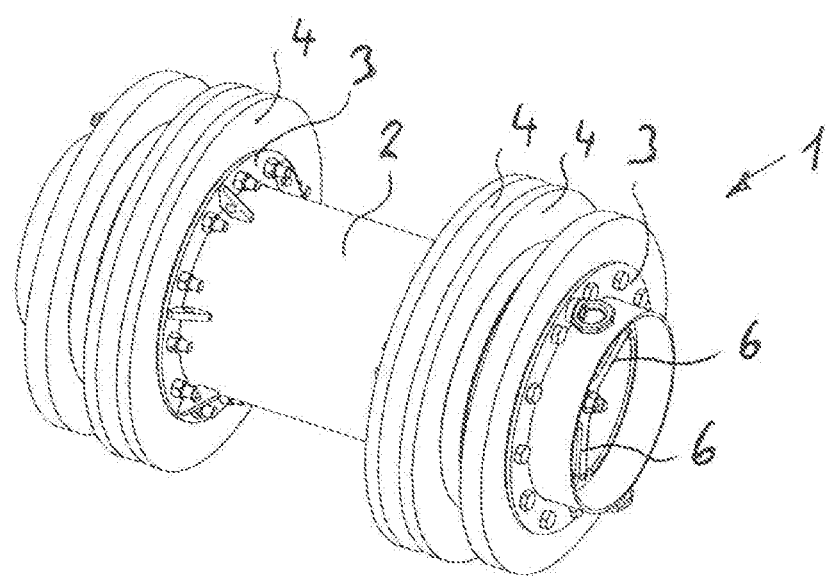
FIG. 1 is a view of a subject-matter according to the invention.

Individual technical features of the embodiment described below may also be combined together with above-described embodiments and the features of the independent claims and any additional claims to form aspects of subject-matter according to the invention. Wherever it is advantageous, functionally identical elements are given the same reference numerals.

According to FIG. 1, a cleaning pig 1 comprises a central member 2 on which sleeves 4 which are secured by means of flanges 3 are arranged. Using these, a pipeline is cleaned.

Figure 2:
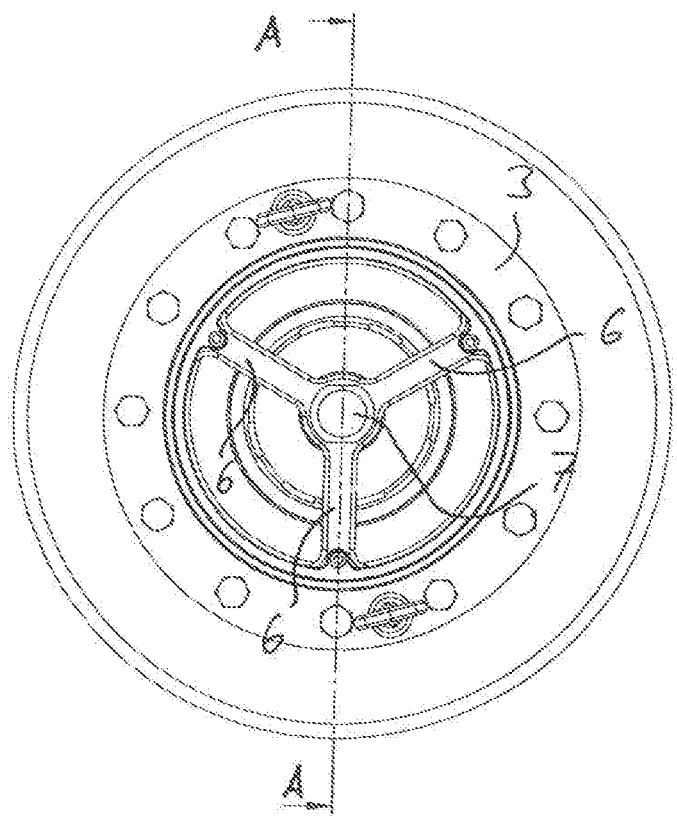
FIG. 2 is a front view of the subject-matter according to FIG. 1.

The central member 2 is constructed in a hollow manner and has a central pin 7 which is retained by means of three inner spacers 6 (cf. FIG. 2). In the section A-A according to FIG. 3, a bypass valve 8 according to the invention (cf. FIG. 4a)) is arranged in the hollow central member 2. The spacers 6 are part of the bypass valve. They retain the central pin 7 which serves to guide a piston 11 and two force storage media 12, 13. The force storage medium 12 is partially arranged in a hollow rod region of a piston rod region 14 and is constructed as a helical spring. The additional force storage medium 13 comprises a plurality of plate springs 16 which are arranged one on the other and which are arranged in hollow-cylindrical shells 17 which can be moved against each other. On the left hollow-cylindrical shell 17 in FIG. 3 the first force storage medium is arranged so that the two force storage media are sequentially in abutment in the longitudinal direction F which also corresponds to the general throughflow direction.

The inspection pig 1 has an influx region 18 and a discharge region 19 through which the medium can enter the bypass valve 8 at one end and which it reaches at the other end when it is discharged from the valve 8.

Figure 3:
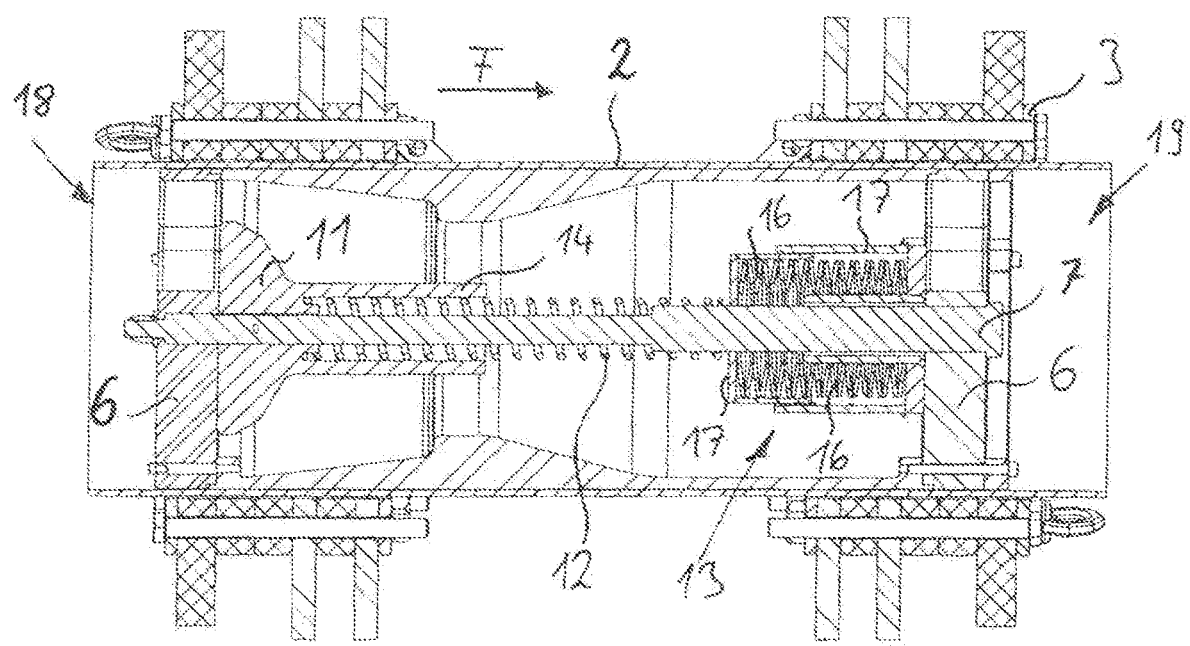
FIG. 3 shows the subject-matter according to FIG. 2 in a section along A-A.

In FIG. 3, the piston 11 is located in a first open position in which a maximum throughflow through the bypass valve 8 is possible.

Figure 4:
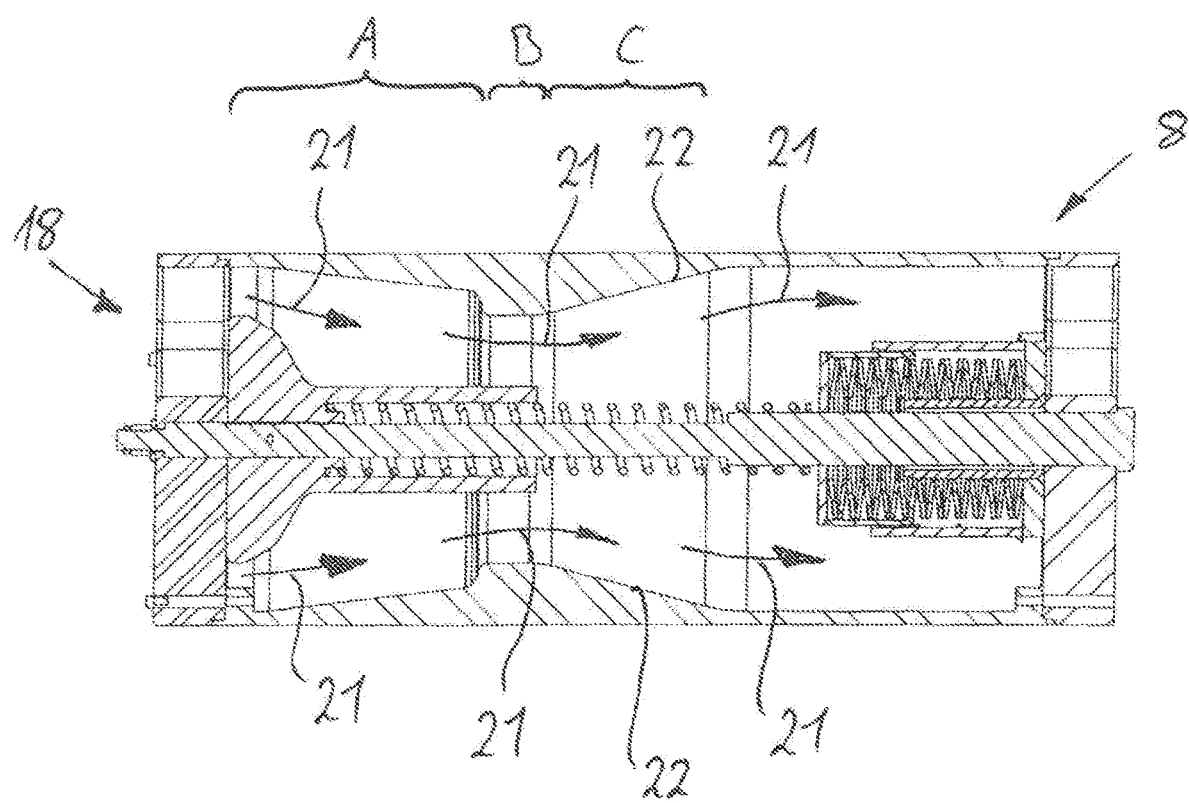
FIGS. 4(a), (b) and (c) show another subject-matter according to the invention in different operating positions.
Figure 4:
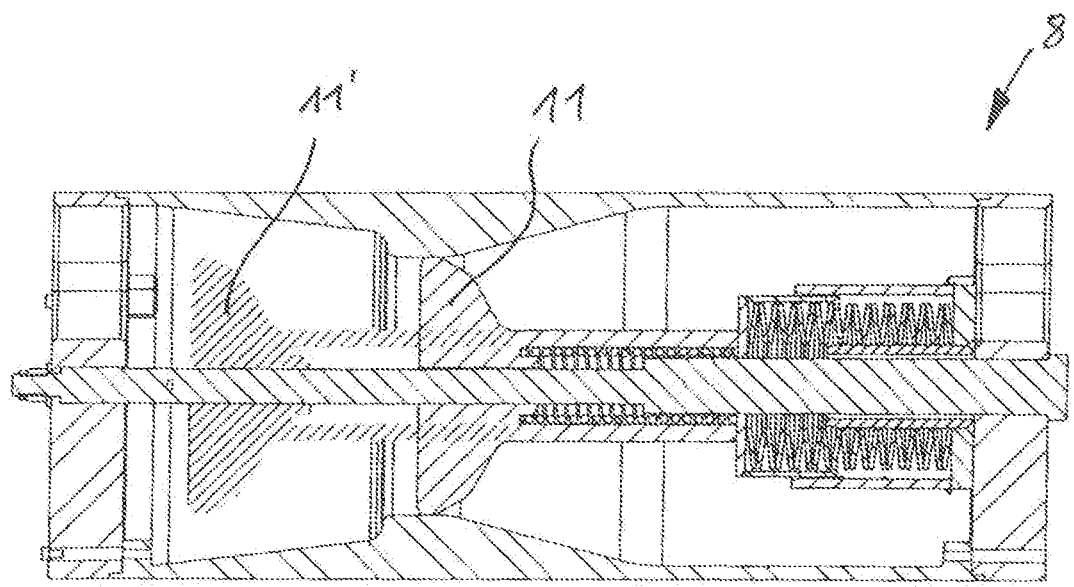
Figure 4:
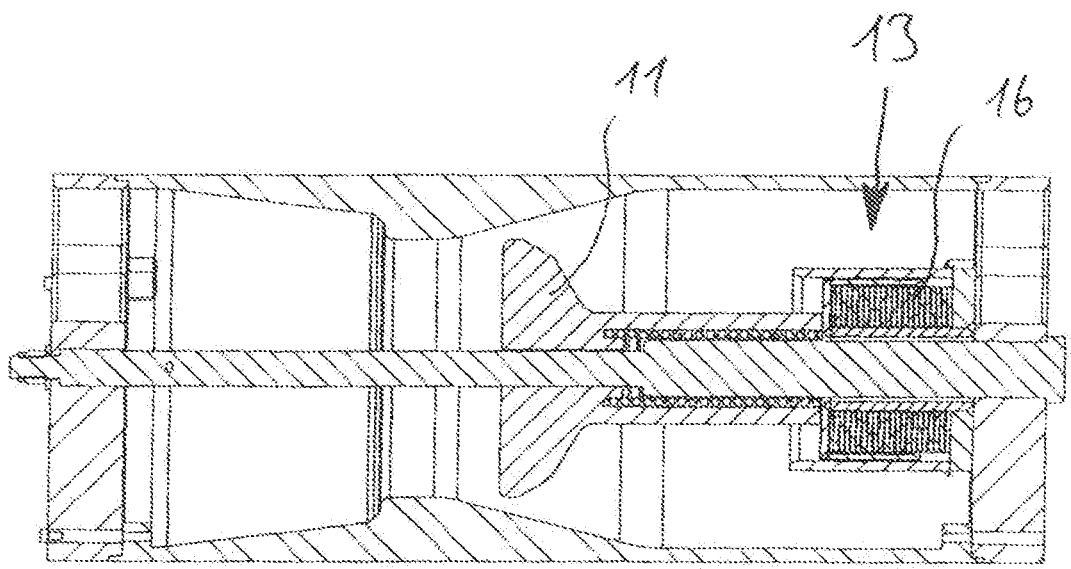

The piston 11 also has this position in an embodiment according to the invention in accordance with FIG. 4*a*), wherein arrows 21 indicate the flow direction through the bypass valve 8. In the sectioned view also in accordance with FIG. 4*a*), the profile of the inner space is made visible by the edges 22. Starting from an inlet opening 18, there is initially a continuously tapering but then abruptly tapering first region A. In this region A, the flow profile of the inner space and the profile of the piston are constructed to be optimised in terms of flow in such a manner that in at least 50% of the drive pressure range of preferably from 0.02 to 0.4 bar the volume flow which is directed through the bypass valve 8 does not change by more than 60% (cf. FIG. 5).

This region is adjoined upstream in the flow direction F by a region B with a substantially consistent inner diameter in which the piston 11 is arranged with the exception of a small leakage flow for a closed state of the bypass valve 8. In a further adjoining manner there is again a region C in which when a maximum pressure is reached, in order to prevent destruction of the bypass valve 8 or the pig 1 or the pipeline, the bypass valve 8 is opened again.

Accordingly, the region A for the bypass valve is the operating region in a pressure range up to 0.4 bar. The region B which is shown with the associated piston position in 4*b*) represents an operating region of preferably 0.4 to 8 bar. Illustrated with shading is the piston 11 in an intermediate position in which the piston 11 is displaced in such a pressure-regulated manner in the longitudinal direction F that the volume flow produces the line shown in FIG. 5.

In the embodiment according to FIG. 4*c*), there is then applied at the left end of the bypass valve 1 in the Figure an operating pressure or drive pressure or simply just pressure of more than 8 bar so that the plate springs 16 of the additional force storage medium 13 are compressed and the piston 11 is moved into the maximum position. The hollow region formed by the region 14 of the piston rod can, when viewed in the longitudinal direction F, be constructed in this instance in such a manner that it precisely receives the helical spring 12 in the position thereof compressed to the maximum extent in the longitudinal direction so that the right end of the region 14 of the piston rod terminates flush with the right end of the helical spring 12 in FIG. 4*c*) and consequently both ends press on the perpendicular portion of the hollow-cylindrical shell 17 and consequently compress the additional force storage medium 13.

Figure 5:
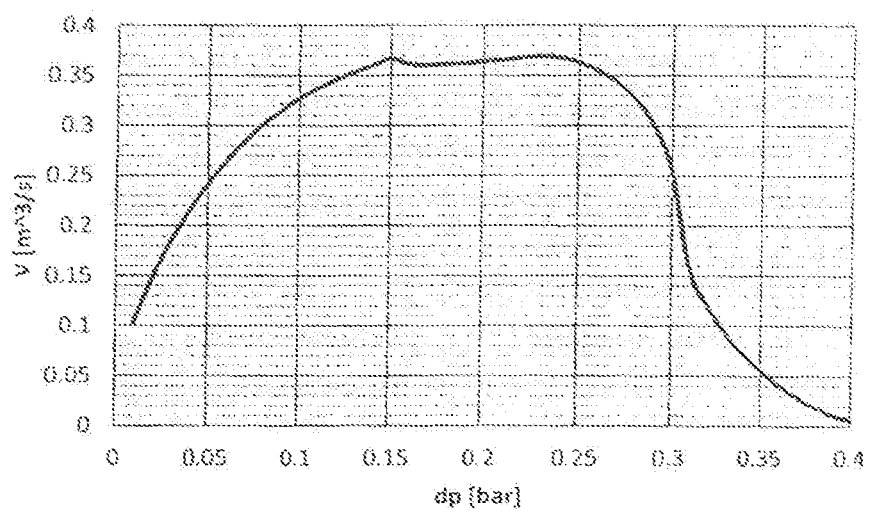
FIG. 5 is a volume flow/pressure graph of the subject-matter according to the invention in accordance with FIGS. 4(a) to (c).

In the volume/flow pressure graph according to FIG. 5, on the X axis the pressure applied to the pig 1 from the rear and on the Y axis the volume flow which is produced thereby are illustrated. It can be seen that over a relatively large pressure range the volume flow is constructed in a comparatively plateau-like manner so that a speed which is as constant as possible of the pig is produced or the pig does not reach speed ranges which are critical for a cleaning or inspection.

The invention claimed is:

1. A bypass valve for an inspection and/or cleaning pig for a pipeline through which a medium flows, the bypass valve comprising:

an inner space which is provided with a flow profile and in which there is arranged a piston which is movable in a longitudinal direction of the bypass valve via a force storage medium in a pressure-dependent manner;

wherein the piston moves between a first open position of the bypass valve which creates a bypass for the medium, and a second position at higher differential pressure, said second position at least substantially closing the bypass, wherein the piston can be further moved from the first position via the second position in the same direction to a third, maximum position at a critical opening pressure which opens the bypass again, wherein a flow cross section released in the maximum position is smaller than a flow cross section present in the first position, but is larger than a flow cross section present in the second position of the piston.

2. The bypass valve according to claim 1, wherein the piston is constructed to assume, in a pressure-dependent manner, intermediate positions in a region (A) between the first and the second position, in a drive pressure range between 0.01 and 0.5 bar, in order to enable a pressure-regulated volume flow through the bypass valve.

3. The bypass valve according to claim 1, wherein the maximum position is located in an upstream and widened region of the inner space with respect to a throughflow direction (F).

4. The bypass valve according to claim 1, wherein at least one of the flow profile of the inner space and the profile of the piston is optimized in terms of flow in such a manner that in at least 50% of the drive pressure region, the volume flow directed through the bypass valve does not change by more than 60%.

5. The bypass valve according to claim 1, wherein the flow profile of the inner space initially tapers continuously, has a consistent inner diameter for the closed position in the longitudinal direction and subsequently expands again with an in particular more significant absolute inclination than in the tapering region.

6. The bypass valve according to claim 1, wherein the piston has a hollow rod region in which the force storage medium is at least partially arranged and is guided by a central pin.

7. The bypass valve according to claim 1, wherein the maximum position is assumed at least one of counter to compression of a second force storage medium and after the pressure-dependent release of an additional piston operating path.

8. The bypass valve according to claim 7, wherein the two force storage media are configured in such a manner that, from the closed position, in order to assume the maximum position, the second force storage medium is compressed to a greater extent in the longitudinal direction than the first force storage medium.

9. The bypass valve according to claim 8, wherein the two force storage media when viewed in the longitudinal direction are arranged one behind the other and in abutment with each other.

10. A pig for at least one of inspection and cleaning of pipelines, comprising:

a central member;

a bypass valve in accordance with claim 1 which is arranged in the central member of the pig.

11. A pig for inspection and cleaning of pipelines, comprising:
a central member which is formed at least in part by a bypass valve in accordance with claim 1.

\* \* \* \* \*